United States Patent Office 3,330,351
Patented July 11, 1967

3,330,351
METHOD FOR INHIBITING THE FLOW OF LIQUID INTO A WELL BORE
George G. Bernard, Crystal Lake, Ill., assignor, by mesne assignments, to Union Oil Company of California, a corporation of California
No Drawing. Filed July 24, 1964, Ser. No. 385,067
8 Claims. (Cl. 166—29)

This invention relates to the treating of subterranean formations penetrated by wells. More particularly, it relates to the treatment of formations containing fluid-producing strata through which a well bore is drilled wherein it is sought to prohibit the influx of the formation fluids into the well bore. Specifically, the invention is primarily concerned with inhibiting the influx of formation fluids into a well bore wherein said well bore is being drilled through the subterranean formation by an apparatus wherein gases are used.

While the invention has particular utility in connection with the drilling of oil wells and the like, utilizing a drilling fluid such as natural gas or air and is described in such connection, it is to be understood that its utility is not confined thereto.

Quite frequently in oil field operations it is desirable to inhibit the flow of formation fluids into a completed well bore or one which is under construction. For instance, after a well has been completed and the formation produces fluids into the well bore, such as formation water or brine, oil and gas, and only the gas is being produced in sufficient quantity to make the operation economical, it is essential that the water-producing and oil-producing strata be capped off or plugged so as not to contaminate or prevent the further production of the natural gas. In other instances, where a well bore is being drilled through a formation, a fluid-producing stratum which has been drilled through can deleteriously affect the continuance of the drilling operation. This is especially true where the apparatus being utilized to drill the well is powered by air or natural gas. In this type of drilling operation it is essential that the drill bit and cuttings at the bottom of the well bore be maintained in as dry a state as possible so that the cuttings will not cause clogging or sticking of the drilling bits and the dry, gaseous fluids will be able to pick up the cuttings and carry them upward to the surface of the earth. Faster and more efficient drilling is thereby accomplished.

The prior art recognizes several methods for treating the formation surrounding a well bore to decrease the rate of flow of either gas, oil, or water into the well. Generally, these methods comprise the packing off of a portion of the well which receives undesirably large quantities of the fluids which are not sought to be recovered, and the treating of the packed off portion of the formation to plug those strata which are producing the undesirable fluids, thereby rendering them impermeable. Known treating agents which have been heretofore proposed include cement and various organic polymers which, upon curing, set up to form gels within the interstices of that part of the formation so treated. In drilling operations, especially air drilling, after drilling through a wet zone or through a fluid-producing stratum which would render further drilling impractical, it has usually been necessary to shut down the drilling operation for extended periods of time to permit packing off, cementing, and/or plugging of the fluid-producing stratum so that the drilling operation could be resumed. It is also known in the art, where a fluid-producing stratum has been penetrated, to remove the accumulated fluid from the bottom of the well bore by the introduction of a foaming agent and subsequent agitation of the foaming agent or surfactant with a gas such that a foam column will be formed within the well bore, entraining the collected fluid therein and thus raising or foaming out the entrained fluids to the surface of the earth, after which the drilling operation can be resumed.

Now, in accordance with this invention, a method has been devised for selectively reducing the flow of a fluid from a particular fluid-producing stratum into a well bore, which well bore has been completed or is in the process of being drilled. This selective treatment is accomplished without the necessity of employing packers, cement, or gel-forming polymers in that the whole extent of the well bore may be subjected to the treating process and, depending on the ultimate end desired, may be adapted selectively to close only those fluid-producing zones which are detrimental to the fluid sought to be recovered or to the drilling process while completing the well bore.

The method of this invention may be applied, for instance, when either gas, water, or oil breaks through into a producing well. If, for example, it is only desired to produce the gas from the formation, the method consists simply of interrupting production and injecting a quantity of a surfactant or foaming agent in a vehicle miscible with the fluids being produced from the strata sought to be plugged, viz., a water-soluble surfactant in an aqueous solution to be injected into the water-producing strata and an oil-soluble surfactant in an oil-soluble solution to be injected into the oil-producing strata. In some instances, because of the production of gas and a natural communication between the various strata, a foam will be immediately generated in that particular stratum, thereby preventing further fluid flow from the treated stratum. Ordinarily, however, it is preferred to follow the injection of surfactant solution by the injection of natural gas or air so that foam generation is not dependent upon contact between the formation gas and the surfactant or foaming-agent-containing solution. The foaming-agent-containing solutions will have a tendency to invade the water or oil-producing stratum rather than the gas-producing stratum because of the fact that foam will be immediately generated as the surfactant solution enters the gas-producing stratum, thereby making it impossible for additional surfactant solution to enter the interstices of the gas-producing stratum. The remainder of the surfactant solution injected will then penetrate the water and oil-producing stratum to a depth depending upon the quantity of the surfactant solution injected and the pressures at which it is injected immediately surrounding the well bore. Thus, in effect, selective plugging of the water-producing and oil-producing strata is had without resorting to the use of packers to isolate the strata to be treated.

Another embodiment, in which the invention will probably have its widest use, is in treating fluid-producing strata during air-drilling operations. In such an instance it is incumbent upon the drilling operators to prohibit the influx of formation fluids into the bottom of the well bore so that the drilling operation can be speedily and effectively carried out. For instance, after a water-producing stratum has been drilled through, it is only necessary to interrupt the air-drilling operations long enough to inject a water-soluble surfactant or foaming agent in an aqueous solution so that the solution penetrates the formation for a radial distance from the well bore of about 5 to 50 feet. After the injection of the surfactant solution, a sufficient quantity of natural gas or air is injected through the well bore into the formation to generate foam within the interstices of the formation immediately adjacent to the well bore area. If desired, an additional quantity of surfactant may be placed at the bottom of the well bore and natural gas or air injection carried out for a sufficient period of time to foam out the fluids trapped in the bottom of the well bore, after which air-drilling operations can be resumed without the deleterious influx of formation fluids. In this embodiment, it can thus be seen that two operations may be carried out at one time, viz., plugging the fluid-producing strata so that the influx of fluids into a well bore is substantially inhibited and cleaning out any fluids which have flowed into the well bore and accumulated in the bottom thereof.

It is an object of this invention to inhibit the influx of fluid into a well bore.

A further object of this invention is to provide a method wherein the influx of fluids from a formation penetrated by a well bore is selectively prohibited.

A further object of this invention is to provide a method of drilling well bores through fluid-producing subterranean formations wherein the influx of the fluids from said formations and strata is substantially reduced.

A further object of this invention is to provide a method of air-drilling wherein the influx of fluids from fluid-producing strata, penetrated by a well bore, is substantially inhibited and at the same time accumulated fluids from the bottom of the well bore are effectively removed.

These and other objects, characteristics and advantages of the invention will be more fully described and those skilled in the art will understand that many variations may be made, without departing from the principles disclosed, in the employment of various arrangements, modes of operation or steps of the method which will not violate the spirit of the invention as denoted by the appended claims.

The amount of the water-base or oil-base solution of foaming agent or surfactant injected into the producing well and into the surrounding formation, or into an uncompleted well in the case of a well bore being drilled through a formation, in accordance with the method of this invention is preferably sufficient to create a treated zone extending radially about 5 to 50 feet from the well bore. Thus, the volume to be used in any specific case will be determined by the thickness and porosity of the formation to be treated.

According to generally accepted definitions, the term "surfactant" is inclusive of only those surface active materials which effect a reduction in the interfacial or surface tension of the solvent in which they are dissolved, but it is not inclusive of materials exhibiting certain other surface phenomena which do not effect a reduction in the interfacial tension of their solvent. The term "surfactant" or "foaming agent" as used in this specification and appended claims denotes a surfactant or foaming agent which will have a tendency to generate foam in a subterranean formation or stratum in the presence of a liquid and a gas. Additionally, the foam generated should have the ability to retard the passage of the fluid therethrough. Because of a variance in the foaming characteristics of any one particular foaming agent, the type of fluid-producing strata to be plugged, and the distance through the formation in which a foam is to be generated, it will sometimes be necessary to conduct a few simple laboratory core experiments to determine the amount of surfactant or foaming agent necessary to effectively plug the interstices of fluid-producing strata. These are tests which are well-known in the art and simply involve taking a core sample from the well bore or from the formation in the general vicinity of the well bore, determining its permeability and porosity, and then determining whether the particular fluid-producing stratum is producing gas, water, or oil. Generally, the amount of surfactant that will be required will range from about 0.5 to 5% by weight of the solution in which it is injected into the formation. It is preferred for reasons of economy, and also to prevent the production of an excessively thick and viscous foam which would require the use of excessively high injection pressures, that excessive quantities of surfactant or foaming agents be avoided. The use of various commercial foaming surfactants or foaming agents is contemplated, the characteristics of which may be determined from available published tables. An example of a satisfactory oil-soluble foaming agent is a 1:1 mixture of dicocodimethylammonium chloride and decyltrimethylammonium chloride. This mixture can be used in the amount of about 2% by weight with excellent results. An example of a suitable water-soluble surfactant or foaming agent is polyoxyethylated octylphenol, known commercially under the trade name "Triton X–100." Other examples of suitable foam-producing agents are dimethyldidodecenylammonium chloride; methyltrioctenyl ammonium iodide; trimethyldecenylammonium chloride; dibutyldihexadecenylammonium chloride; water-soluble salts of esters of $C_3$–$C_6$ sulfo dicarboxylic acids having the general formula

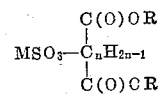

where M is a substituent forming a water-soluble salt, such as alkali metals, ammonium, and substituted ammonium, R is a $C_3$–$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate, and others; and water-soluble perfluoroalkanoic acids and salts having 3–24 carbon atoms per molecule, e.g., perfluorooctanoic acid, perfluoropropanoic acid, perfluorononanoic acid. Other surfactive agents which may be used in the practice of this invention are:

| Trade Name | Chemical Name |
|---|---|
| Aerosol C–61 | Ethanolatedalkylguanidine-amine complex. |
| Aerosol OS | Sodium isopropylnaphthalene sulfonate. |
| Arquad 2 C | Dicocodimethylammonium chloride. |
| Arquad T | Tallow trimethylammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT–60 | Condensation of hydrogenated tallow amide and ethylene oxide. |
| Hyonic FA–75 | Modified fatty alkylolamide. |
| Miranol HM Concentrate | Ethylene cyclomido 1-lauryl, 2-hydroxy ethylene Na alcoholate methylene Na carboxylate. |
| Miranol MM Concentrate | Same as Miranol HM except myristyl group is substituted for lauryl group. |
| Nacconal NR | Alkylarylsulfonate. |
| Ninol AA62 | Lauric diethanolamide. |
| Ninol 1001 | Fatty acid alkanolamide. |
| Petrowet R | Sodium alkylsulfonate. |
| Pluronic L44 | Condensation product of ethylene oxide with propylene glycol. |
| Product BCO | C-cetyl betaine. |
| Renex 650 | Polyoxyethylenealkyl aryl ether. |
| Sorbit AC | Sodium alkylnaphthalenesulfonate. |
| Sulfanole FAF | Sodium salt of fatty alcohols, sulated. |
| Triton AS–30 | Sodium lauryl sulfate. |
| Triton X–100 | Alkylarylpolyetheralcohol. |
| Span 20 | Sorbitan monolaurate. |
| Span 40 | Sorbitan monopalmitate. |
| Span 85 | Sorbitan trioleate. |
| Tween 65 | Polyoxyethylene sorbitan tristearate. |
| Tween 81 | Polyoxyethylene sorbitan monooleate. |
| OPE 1 | Octylphenoxyethanols. |
| OPE 2 | Do. |
| OPE 3 | Do. |

| Trade Name | Chemical Name |
|---|---|
| Triton GR-7 | Dioctyl sodium sulfosuccinate. |
| Triton B-1956 | Modified phthalic glycerol alkyl resin. |
| Triton X-45 | Iso-octylphenoxypolyethoxyethanol (about 5 ethoxy groups per molecule). |

As a specific example of this invention, a well bore is being drilled with a drilling apparatus using air as the prime remover of the drill cuttings. Drilling through the formation is greatly affected as the drill bit breaks through and past a water-producing stratum at a depth of approximately 2,000 ft. The average permeability of the formation is about 100 millidarcies; that of the water-producing stratum about 4000 millidarcies. The area of the water-producing stratum at the well-bore face is approximately 9 sq. ft. and the total influx of water into the well bore is approximately 240 bbls. per day, making further drilling highly inefficient. Air drilling is terminated and 3 bbls. of "Triton X-100" are placed in the well bore to make a solution of about 1 wt. percent surfactant concentration. Air at a rate of 2000 s.c.f./min. is injected into the well bore at a pressure of about 500 p.s.i. for a period of about 6 hours. Air drilling operations are resumed and proceed at a rapid pace in that water from the water-producing stratum is inhibited from flowing into the well bore. As the generated foam begins to break down and other fluid-producing strata are penetrated, additional similar treatments are performed.

It can thus be seen that I have discovered an economical method which combines two functions by the use of just one material. The generated foam not only inhibits and prohibits the influx of fluids into the well bore by plugging the interstices of the fluid-producing strata but also removes accumulated liquids from the bottom of the bore hole making further air drilling of the well more effective. While the example is confined to placing the surfactant or foaming agent into a water-filled bore hole, it will be readily apparent that, instead of placing the surfactant or foaming agent directly in the borehole, it may be incorporated in an aqueous vehicle and then injected into the well bore and into the formation. After a sufficient quantity of the surfactant solution has been injected into the formation to penetrate same to a radial distance from the well bore of about 5–50 feet, air injection may be commenced so that very little foam will be generated in the well bore itself. Thereafter, air may be injected at a lower pressure to generate foam in the bottom of the well bore, thereby entraining the accumulated liquid and drill cuttings and lifting them to the surface, or, alternatively, the well bore may be pumped dry of the foam liquid and drill cuttings. In addition, while the foam has been described as being formed in situ, it is possible to generate the foam on the surface and inject it into the well bore and thence into the formation in the foam state, if no regard for injection apparatus and pressures are important.

I claim:

1. A method of inhibiting the influx of water into a well bore, wherein said well bore penetrates a water-bearing subterranean formation and wherein the pressure in said well bore is below the formation pressure, comprising injecting into said well bore a surfactant-containing solution sufficient in amount and under sufficient pressure to penetrate said formation to a radial distance of at least about 5 to 50 ft. from said well bore, said surfactant effecting a reduction in the surface tension of the solvent in which it is dissolved, and thereafter injecting a gas, whereby a foam, stable under formation conditions, is formed in the area of the treated formation surrounding said well bore.

2. In the drilling of well bores through fluid-producing subterranean formations, the improvement which comprises injecting into said well bore a surfactant, capable of lowering the surface tension of a liquid in which it is dissolved and of forming a stable foam under formation conditions upon intimate contact with a liquid and a gas, under sufficient pressure to dispose said surfactant in the formation adjacent said well bore for a radial distance of at least 5 ft. and thereafter injecting a gas whereby foam is formed in the fluid-producing strata penetrated by said well bore, thereby inhibiting the influx of fluids into said well bore.

3. In the gas drilling of well bores through fluid-producing formations, the improvement which comprises injecting through said well bore and into said formation a surfactant-containing solution, said solution being injected in a quantity sufficient to penetrate the formation a radial distance of about 5 to 50 feet, said surfactant effecting a reduction in the surface tension of the liquid in which it is dissolved and being present in sufficient quantity to form a stable foam, under formation conditions, when said solution is contacted by gas, and thereafter injecting through said well bore and into said formation a gas, whereby foam is formed in the fluid-producing strata penetrated by said well bore, thereby inhibiting the influx of fluids into said well bore.

4. In the air drilling of well bores through fluid-producing formations the method which comprises the steps of
 (a) terminating air drilling when a fluid-producing stratum is drilled through,
 (b) injecting a surfactant-containing solution through the well bore and into the formation, said solution being miscible with the fluid in said fluid-producing stratum and in a quantity sufficient to penetrate the formation a radial distance of about 5 to 50 feet, said surfactant being present in sufficient quantity to form a stable foam under formation conditions when said solution is contacted by gas,
 (c) injecting a sufficient quantity of gas to generate foam in the formation immediately adjacent to said well bore, and
 (d) thereafter terminating gas injection and resuming said air drilling,
whereby the influx of formation fluid into said well bore is substantially inhibited.

5. The method in accordance with claim 4 wherein the fluid in said fluid-producing formations is formation water and said surfactant is incorporated in said solution in the amount of about 0.1 to 10% by weight.

6. The method in accordance with claim 5 wherein said gas is air.

7. The method in accordance with claim 4 wherein the fluid in said fluid-producing formations is petroleum.

8. The method in accordance with claim 4 which additionally includes disposing a sufficient amount of said solution in the bottom of said well bore and injecting gas for a sufficient period of time to remove the accumulated fluids in the bottom of said well bore.

References Cited

UNITED STATES PATENTS

| 2,053,285 | 9/1936 | Grebe | 166—41 |
| 2,127,662 | 8/1938 | Grebe | 166—42 |
| 3,207,218 | 9/1965 | Holbrook et al. | 166—32 |

OTHER REFERENCES

Surfactant Treatment Selectively Seals Off Water Entry, Brown, The Petroleum Engineer, November 1957, pages B-72, B-80, B-84, B-86.

CHARLES E. O'CONNELL, *Primary Examiner.*

JAMES A. LEPPINK, *Examiner.*